(12) United States Patent
Wah

(10) Patent No.: US 6,792,655 B2
(45) Date of Patent: Sep. 21, 2004

(54) APPARATUS FOR CORRECTING AIRFOIL TWIST

(75) Inventor: Lum Kok Wah, Singapore (SG)

(73) Assignee: General Electric Company, Schenectady, NY (US)

(*) Notice: Subject to any disclaimer, the term of this patent is extended or adjusted under 35 U.S.C. 154(b) by 113 days.

(21) Appl. No.: 10/038,074

(22) Filed: Nov. 9, 2001

(65) Prior Publication Data

US 2003/0088958 A1 May 15, 2003

(51) Int. Cl.[7] .................................................. B23P 15/00
(52) U.S. Cl. ........................................ 29/23.51; 33/545
(58) Field of Search ............................ 29/859.2, 23.51, 29/407.01, 407.04, 407.05; 33/501, 545, 548, 546

(56) References Cited

U.S. PATENT DOCUMENTS

| 4,146,967 A | 4/1979 | Rohner et al. ............ 33/174 C |
| 4,805,351 A | * 2/1989 | Dobson et al. ............... 451/28 |
| 4,866,828 A | * 9/1989 | Fraser ....................... 29/889.1 |
| 4,908,782 A | 3/1990 | Pekarek et al. ............. 364/560 |
| 6,209,216 B1 | 4/2001 | Bear ........................... 33/530 |

FOREIGN PATENT DOCUMENTS

JP          60064737       * 4/1985

* cited by examiner

Primary Examiner—Irene Rosenbaum
(74) Attorney, Agent, or Firm—William Scott Andes; Armstrong Teasdale LLP (57) ABSTRACT

A system for correcting twist in airfoil components includes a first fixture assembly for holding a first end of an airfoil component and a second fixture assembly for holding a second end of the airfoil component. A rotary drive unit is provided for rotating the first fixture assembly. A gage is included for measuring twist angle in the airfoil component, and a controller controls the rotary drive unit in response to input from the gage to twist the airfoil component. In operation, the airfoil component's twist angle measured by the gage is fed to the controller. The controller computes how much the airfoil component needs to be twisted to achieve a desired twist angle, and the first fixture assembly is then rotated sufficiently to twist the airfoil component to the desired twist angle.

20 Claims, 7 Drawing Sheets

APPARATUS FOR CORRECTING AIRFOIL TWIST

BACKGROUND OF THE INVENTION

This invention relates generally to the repair of airfoil components used in gas turbine engines and more particularly to methods and apparatuses for correcting airfoil twist in such components.

A gas turbine engine operates according to well known principles wherein an incoming stream of atmospheric air flows through the engine along an axial flow path. A portion of the incoming air is compressed in a compressor section of the engine and then mixed with fuel and burned in a combustor section to produce a high energy, high temperature gas stream. The hot gas stream exits the combustor and subsequently passes through a turbine section that extracts energy from the hot gas stream to power the compressor and provide useful work such as powering an aircraft in flight. The compressor and turbine sections each typically include a plurality of stator vanes and rotor blades having airfoils that interact with the gas flow. The airfoils are designed to a precise shape and contour to optimize engine performance. The airfoil contour usually includes a twist from root to tip to maximize aerodynamic efficiency.

The airfoil components, as well as other components of the engine, are exposed to conditions during engine operation that limit their effective service life. These components are subjected to vibratory stresses and high temperatures and can thus become fatigued, cracked, corroded and otherwise damaged over time such that they must be either repaired or replaced to maintain safe, efficient engine operation. Airfoil components can also lose their twist because of inherent elastic loads and (in the case of rotor blades) centrifugal loads generated by rotor rotation.

Because airfoil components are relatively expensive, it is generally more desirable to repair them whenever possible. Thus, airfoil components are routinely inspected for maintenance purposes, and a wide variety of repair processes have been developed. When airfoil components are brought into a repair shop, it is often necessary to correct the airfoil twist in addition to any other repairs that are to be made. Currently, correction of twist is accomplished by holding the airfoil component in a twisting fixture and applying force to twist the component. The airfoil twist angle is then manually measured after each twist, and this process is repeated until the correct twist angle is obtained. Because the user can only estimate how much force to apply each time, this approach often requires many iterations to achieve the desired twist angle. This results in a time-consuming, labor-intensive and costly process. This approach can also result in over-twist due to applying excessive force.

Accordingly, it would be desirable to have a more accurate, more productive approach to correcting twist in airfoil components.

BRIEF SUMMARY OF THE INVENTION

The above-mentioned need is met by the present invention, which provides a system for correcting twist in airfoil components. The system includes a first fixture assembly for holding a first end of an airfoil component and a second fixture assembly for holding a second end of the airfoil component. A rotary drive unit is provided for rotating the first fixture assembly. A gage is included for measuring twist angle in the airfoil component, and a controller controls the rotary drive unit in response to input from the gage to twist the airfoil component. In operation, the airfoil component's twist angle measured by the gage is fed to the controller. The controller computes how much the airfoil component needs to be twisted to achieve a desired twist angle, and the first fixture assembly is then rotated sufficiently to twist the airfoil component to the desired twist angle.

The present invention and its advantages over the prior art will become apparent upon reading the following detailed description and the appended claims with reference to the accompanying drawings.

BRIEF DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
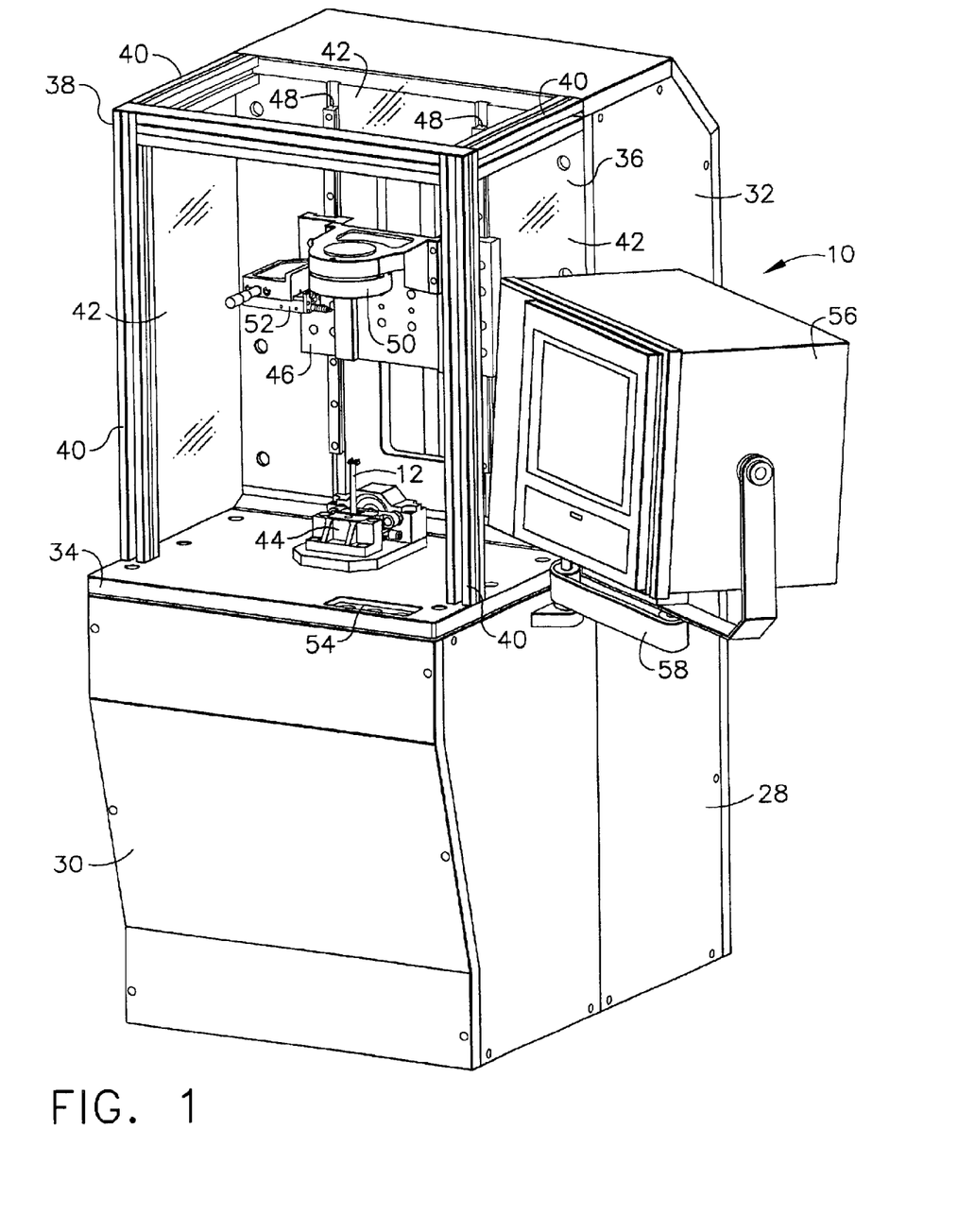
FIG. 1 is a perspective view of a system for correcting twist in airfoil components.
Figure 2:
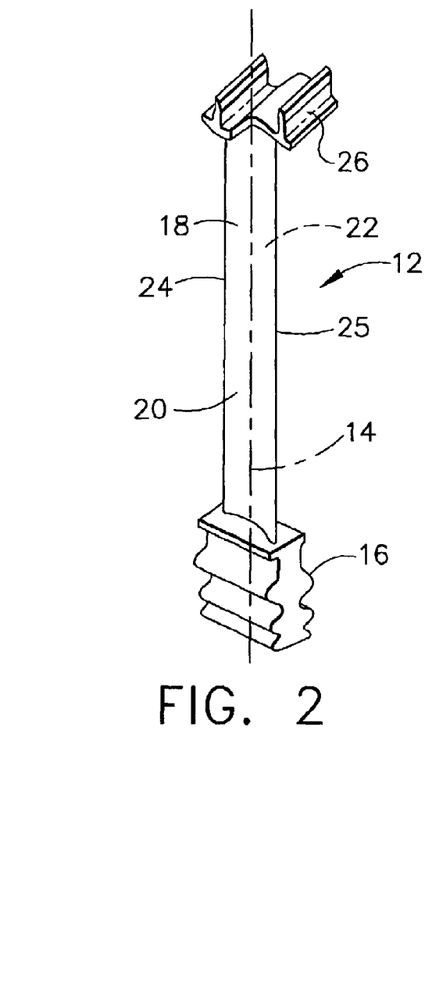
FIG. 2 is a perspective view of a low pressure turbine blade that is one type of airfoil component that can be twist corrects by the system of FIG. 1.

Referring to the drawings wherein identical reference numerals denote the same elements throughout the various views, FIG. 1 illustrates a system 10 for correcting twist in airfoil components, such as the turbine rotor blade 12 shown in FIG. 1 by way of example only. The blade 12, which is shown in more detail in FIG. 2, is a first stage low pressure turbine blade having a longitudinal axis 14. The blade 12 includes integrally formed shank and airfoil portions 16 and 18, respectively. The shank 16 is provided with a dovetail configuration for securely mounting the blade 12 to a rotor disk (not shown) in a conventionally known manner. The airfoil 18 extends radially outwardly from the shank 16 and into the hot gas stream. The airfoil 18 has a concave pressure side 20 and a convex suction side 22 joined together at a leading edge 24 and at a trailing edge 25. A tip shroud 26 is formed on the tip of the airfoil section 18. When the blade 12 is installed in a gas turbine engine, the tip shroud 26 contacts the tip shrouds of the adjacent blades such that all of the tip shrouds collectively define the outer radial boundary for the hot gas stream passing through the gas turbine engine. The blade 12 is twisted about the longitudinal axis 14 to a desired twist angle so as to provide optimum performance. The blade 12 is shown here only as an example of an airfoil component that can have its twist corrected by the system 10. The present invention is not limited to low pressure turbine blades. As will become apparent, the system 10 can be configured to correct twist in other types of airfoil components, including high pressure turbine blades, compressor blades and stator vanes.

Referring again to FIG. 1, the system 10 includes a base 28 having a lower portion 30 and an upper portion 32 extending vertically upward from the lower portion 30. The lower portion 30 supports a main horizontal plate 34, and the upper portion 32 supports a main vertical plate 36. The horizontal and vertical plates 34, 36 are arranged in an L-shaped configuration to define a work area. The work area is enclosed by a frame 38 comprising a plurality of frame members 40 that are made of a relatively strong material such as aluminum. Two frame members 40 extend perpendicularly upward from either side of the horizontal plate 34, near the forward edge thereof. Two other frame members 40 extend perpendicularly outward from respective upper corners of the vertical plate 36. The distal end of each horizontal frame member 40 is joined to the distal end of the corresponding vertical frame member 40. A fifth frame member 40 extends horizontally between the two frame member joints. The sides and top of the frame 38 are covered with transparent panels 42 to further enclose the work area. The panels 42 can be made from a strong, clear plastic material. The front of the frame 38 is left open to provide access to the work area. Safety sensors (not shown) can be located on the front of the frame 38 to shut down the system 10 if an operator reaches into the work area during operation.

A lower fixture assembly 44 is mounted on the horizontal plate 34 within the frame 38. As will be described in more detail, the lower fixture assembly 44 includes means for clamping the blade shank 16 and also provides rotary force for twisting the blade 12. The system 10 further includes a carriage 46 that is slidingly mounted on the vertical plate 36 via a pair of vertically extending rails 48 fixedly attached to the vertical plate 36. The carriage 46 supports an upper fixture assembly 50 directly above the lower fixture assembly 44 and a gage 52 for measuring the twist angle of the blade 12. The carriage 46 is capable of moving linearly along the rails 48 toward or away from the lower fixture assembly 44. The carriage 46 is moveable to a raised position (shown in FIG. 1) to provide clearance for removing and/or loading a blade 12 in the lower fixture assembly 44. The carriage 46 also can be moved to a lowered position in which the upper fixture assembly 50 engages the shroud 26 of the blade 12. The upper fixture assembly 50 holds the shroud 26 while the lower fixture assembly 44 applies a rotary force to the shank 16, thereby twisting the blade 12. The gage 52 is positioned on the carriage 46 so as to contact the blade airfoil 18 for measuring the blade's twist angle. For consistent twist angle measurements, each component undergoing twist correction should be loaded in the system 10 with the same orientation. In one preferred embodiment, the blade 12 is loaded with the airfoil convex side 22 facing outward so that the gage 52 will contact the convex side 22. Alternatively, it would be possible to configure the system 10 so that blades would be loaded with their concave sides facing outward.

A main power switch 54 is located on a forward corner of the horizontal plate 34. The main power switch 54, which can be a key-locked type switch, is used to turn the system 10 on and off.

The system 10 further includes a controller 56 for controlling the rotary motion of the lower fixture assembly 44 and the linear motion of the carriage 46. The controller 56 can be a commercially-available personal computer mounted on a support 58 attached to the side of the base 28. In one embodiment, the controller 56 has a touch-screen display monitor that facilitates operation of the system 10. The controller 56 includes a software application, referred to hereinafter as the "Auto Twist" software, that determines the current twist angle of the blade 12 based on input from the gage 52 and causes the blade 12 to be twisted accordingly to correct the twist angle. In one embodiment, the Auto Twist software is a Windows-based application that stores all twist information and call up functions for a large number of airfoil component models.

Figure 3:
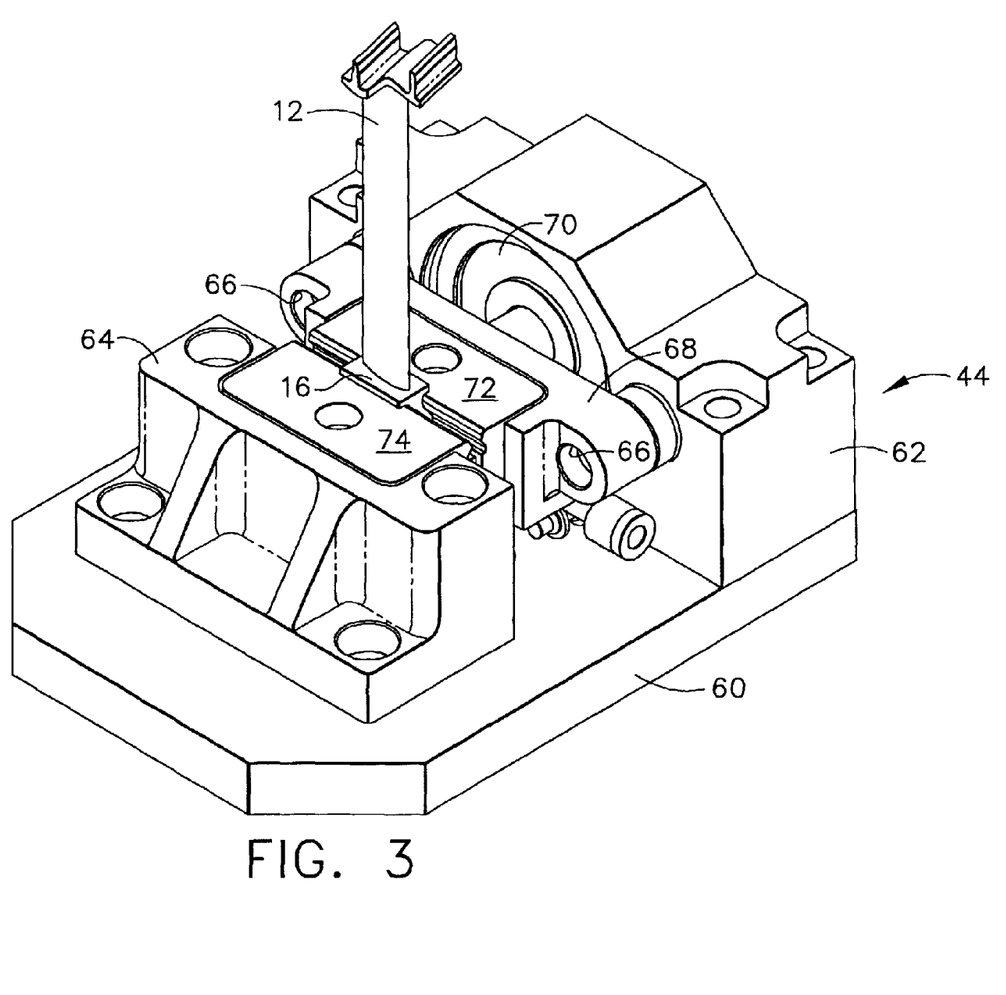
FIG. 3 is a perspective view of a lower fixture assembly from the system of FIG. 1.

Turning now to FIG. 3, the lower fixture assembly 44 includes a base plate 60, a first support block 62, and a second support block 64. The first support block 62 is fixedly secured to the base plate 60 so as to extend along one edge thereof. The second support block 64 is fixedly secured to the base plate 60 at a location spaced from the first support block 62 and is oriented parallel thereto. Two guide rods 66 extend toward the second support block 64 from the side of the first support block 62. A slide block 68 is slidingly mounted on the guide rods 66. A pneumatic cylinder unit 70 is mounted on the first support block 62 and is arranged to engage the slide block 68. The pneumatic cylinder unit 70 thus forces the slide block 68 toward the second support block 64 when actuated. The pneumatic cylinder unit 70 can also be controlled to retract the slide block 68 away from the second support block 64. The slide block 68 supports a first jaw 72, and the second support block 64 supports a second jaw 74 in juxtaposition with the first jaw 72. The first and second jaws 72, 74 are configured to engage corresponding sides of the blade shank 16. Thus, when the pneumatic cylinder unit 70 forces the slide block 68 toward the second support block 64, the two jaws 72, 74 act in concert to firmly clamp the blade shank 16. It should be noted that the jaws 72, 74 are interchangeable. That is, different sets of jaws can be mounted to the slide block 68 and the second support block 64 for clamping components other than the blade 12, such as high pressure turbine blades, compressor blades and stator vanes.

Figure 4:
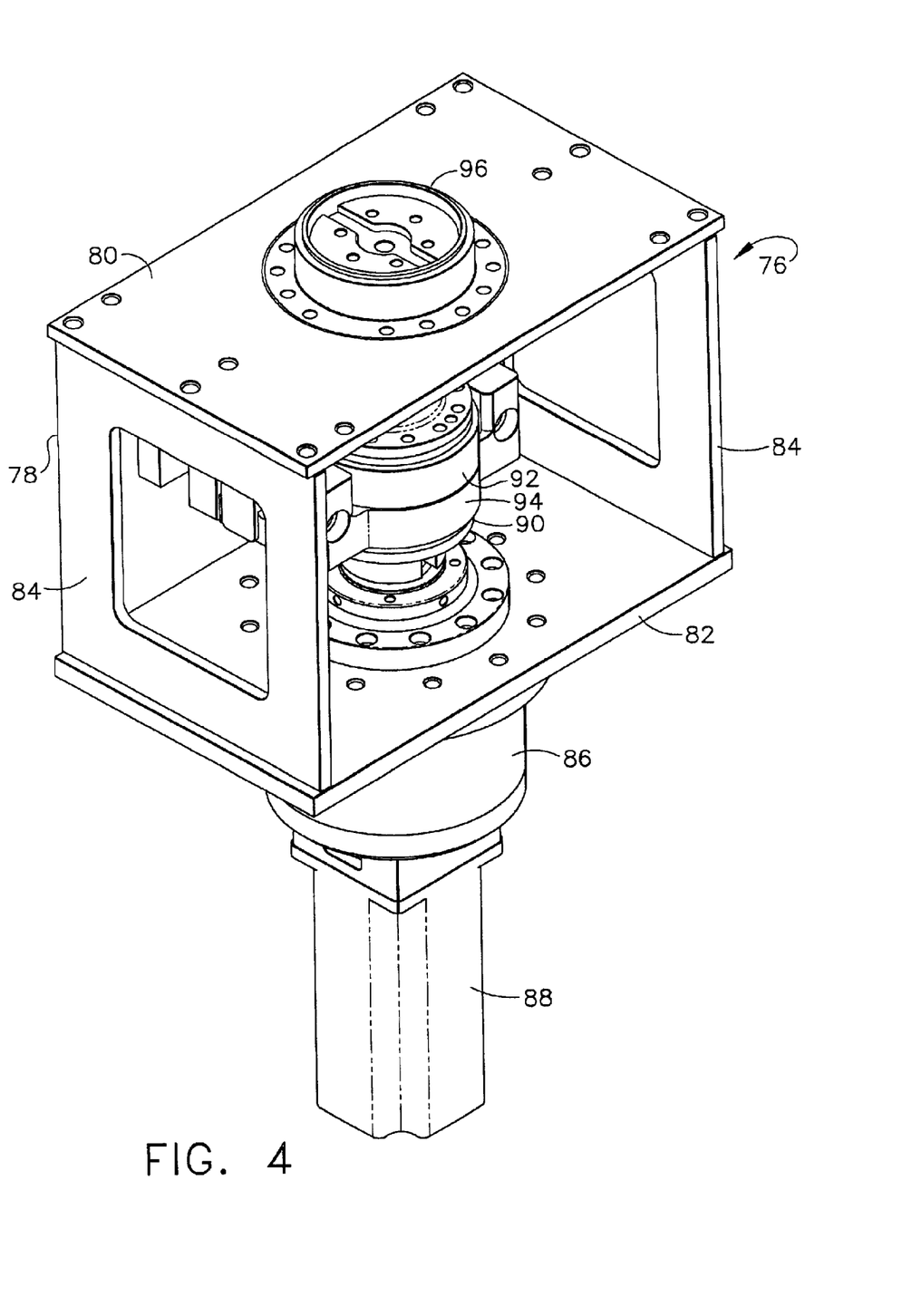
FIG. 4 is a perspective view of a rotary drive unit for rotating the lower fixture assembly of FIG. 3.

Referring to FIG. 4, a rotary drive unit 76 for rotating the lower fixture assembly 44 is shown. The rotary drive unit 76 is located underneath the horizontal plate 34, directly below the lower fixture assembly 44 and includes a support frame 78 for connecting the rotary drive unit 76 to the horizontal plate 34. The support frame 78 comprises an upper plate 80, a lower plate 82, and two end plates 84 connecting the upper and lower plates 80,82 in a box-like configuration. The upper plate 80 is attached to the underside of the horizontal plate 34.

The rotary drive unit 76 further includes a gear reducer unit 86 mounted to the lower plate 82 and a rotary motor 88 coupled to the gear reducer unit 86. In one embodiment, the gear reducer unit 86 is a high harmonic gear reducer and the rotary motor 88 is a brushless DC servomotor. A shaft from the gear reducer unit 86 extends through the lower plate 82 and drivingly engages a torque sensing assembly 90 located between the upper and lower plates 80, 82. The torque sensing assembly 90 comprises top and bottom thrust plates 92, 94 and two load cells disposed between the thrust plates 92, 94 that function to sense the amount of torque being generated by the rotary drive unit 76.

A universal output adapter 96 is mounted on top of the upper plate 80 and is drivingly coupled to the torque sensing assembly 90. The output adapter 96 extends through an opening in the horizontal plate 34 so as to engage the underside of the base plate 60 of the lower fixture assembly 44. In operation, the rotary motor 88, under control of the controller 56, drives the output adapter 96 via the gear reducer unit 86 and the torque sensing assembly 90. Rotation of the output adapter 96 is transmitted to the base plate 60, causing the lower fixture assembly 44 to rotate and provide the twist action for twisting the blade 12 about its longitudinal axis 14. The torque sensing assembly 90 outputs a signal representative of the sensed torque to the controller 56 to enable torque control.

Figure 5:
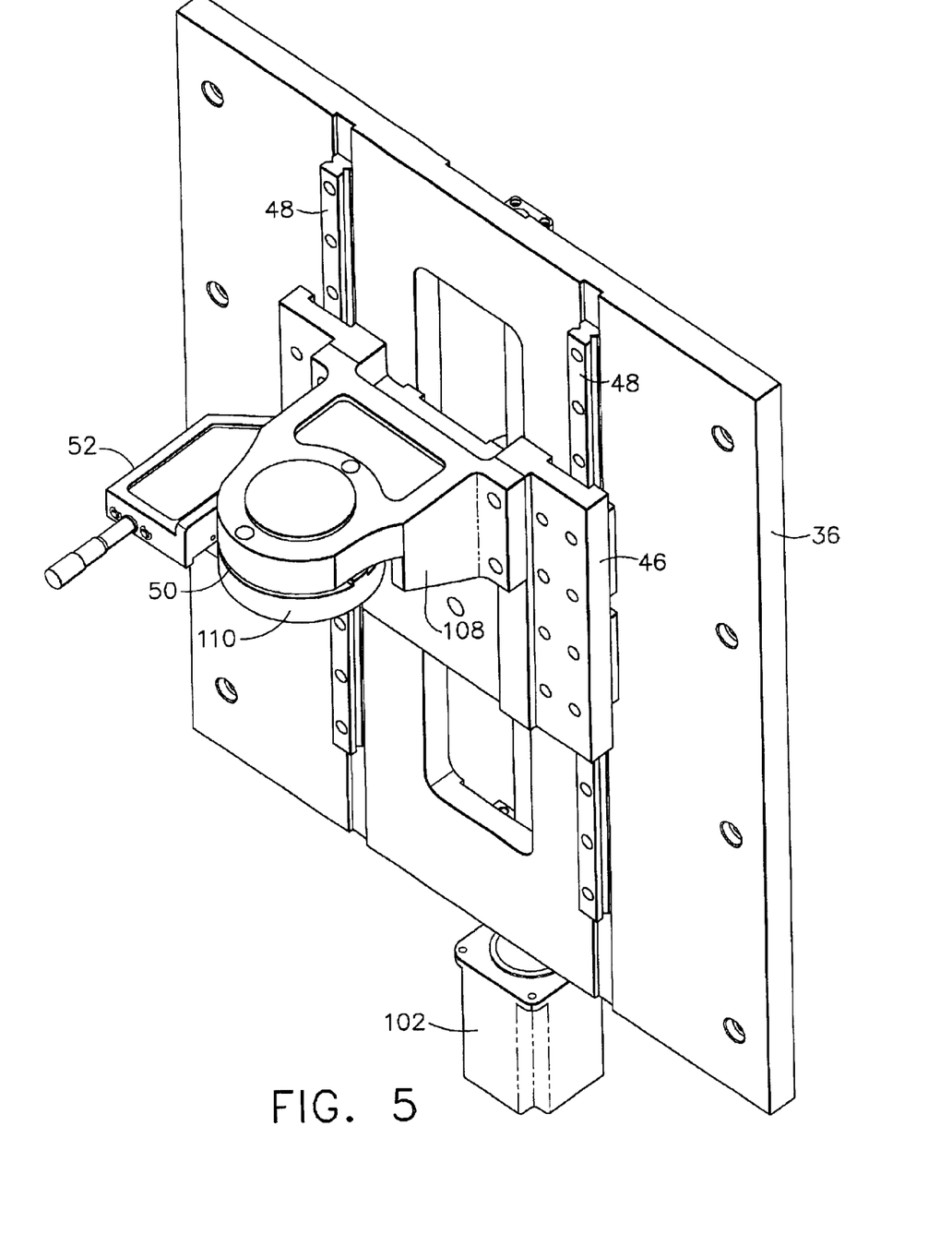
FIG. 5 is a front perspective view of an upper fixture assembly from the system of FIG. 1.
Figure 6:
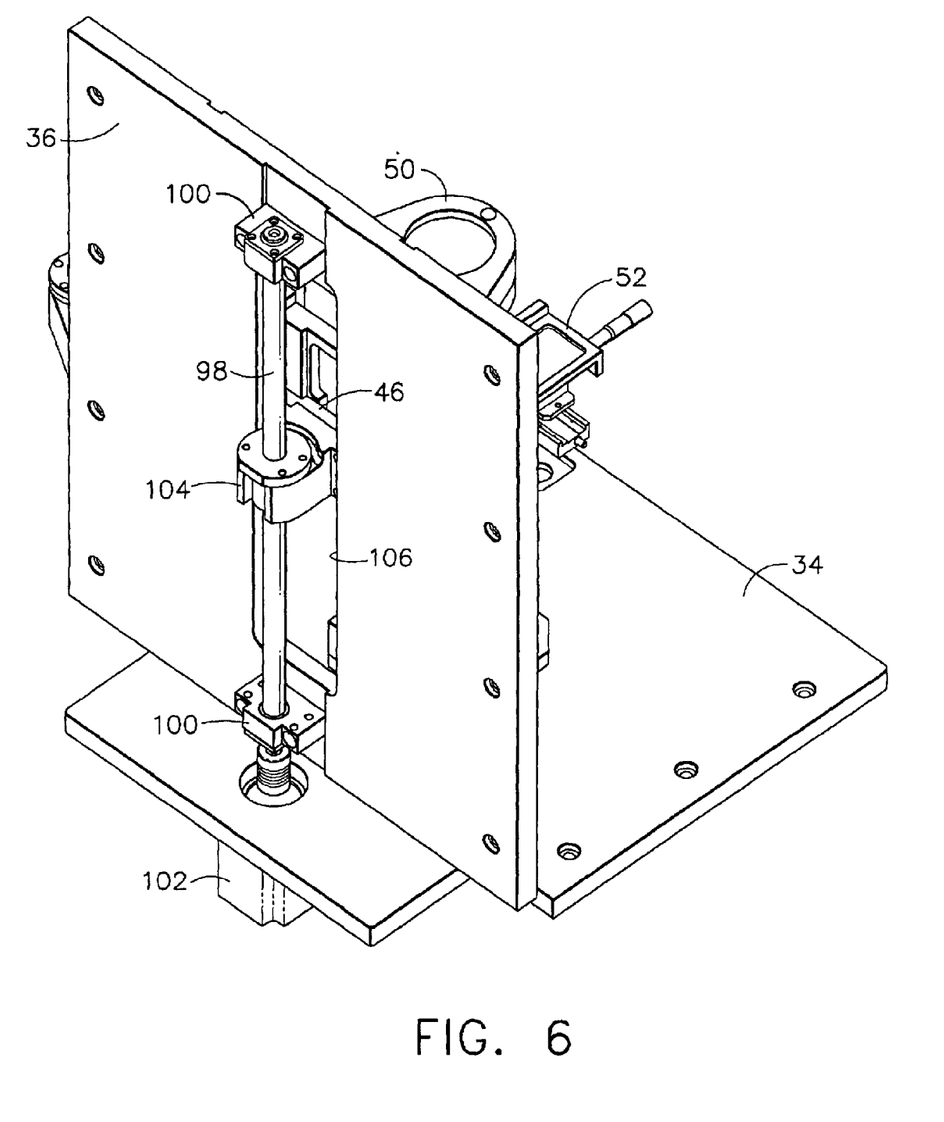
FIG. 6 is a rear perspective view of the upper fixture assembly of FIG. 5.

Referring now to FIGS. 5 and 6, the operation of the carriage 46 is described in more detail. As mentioned above, the carriage 46 is slidingly mounted on the vertical plate 36 via a pair of vertically extending rails 48. One embodiment for linearly moving the carriage 46 includes a ball screw arrangement in which a screw 98 (FIG. 6) is rotatively mounted in a vertical orientation to the back side of the vertical plate 36 by upper and lower journals 100. The lower end of the screw 98 extends through an opening in the horizontal plate 34 and is drivingly coupled to a motor 102 disposed below the horizontal plate 34. The motor 102, which can be a high resolution, high accuracy stepper motor, is controlled by the controller 56 to rotate the screw 98 in either direction. A nut 104 is threadingly mounted onto the screw 98 (between the upper and lower journals 100) such that rotation of the screw 98 in a first direction causes the nut 104 to move upward along the screw 98 and rotation of the screw 98 in the opposite direction causes the nut 104 to move downward. A portion of the nut 104 extends through a vertical slot 106 formed in the vertical plate 36 in alignment with the screw 98. This portion of the nut 104 is fixedly attached to the back side of the carriage 46. Accordingly, the carriage 46 is moved up and down in a vertical direction as the screw is rotated in the first and second directions, respectively. The slot 106 has a sufficient vertical length to permit the desired range of motion for the carriage 46.

Figure 7:
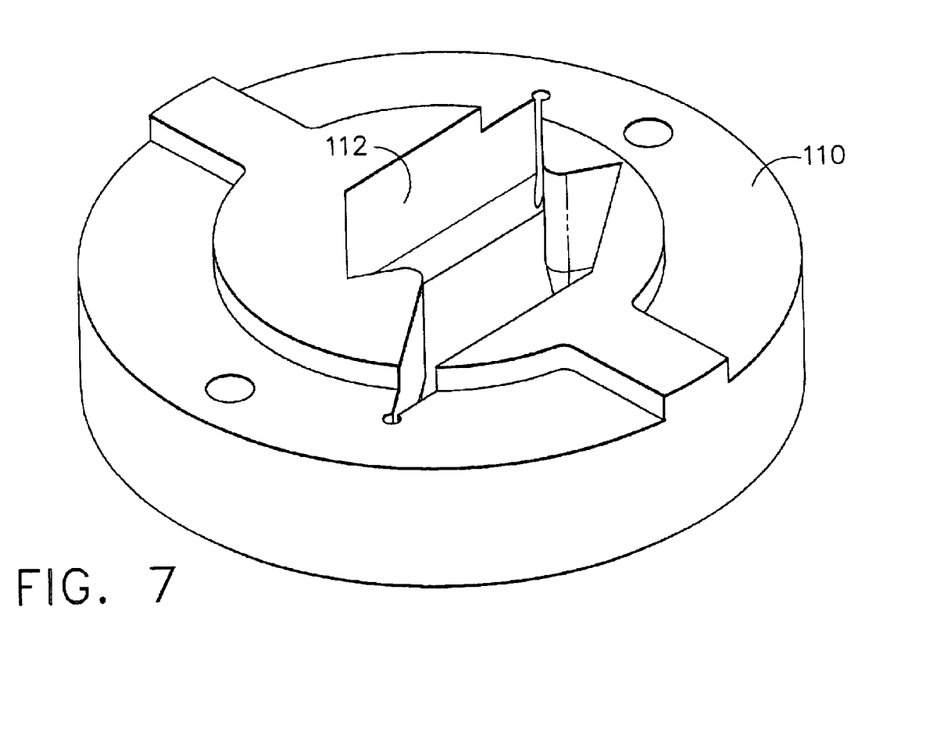
FIG. 7 is a perspective view of a jaw used in the upper fixture assembly of FIG. 5.

As mentioned above, the carriage 46 supports the upper fixture assembly 50, which is aligned with the axis of the lower fixture assembly 44, as best seen in FIG. 1. As seen in FIG. 5, the upper fixture assembly 50 includes a jaw holder 108 fixedly attached to the front side of the carriage 46 and a jaw 110 fixedly attached to the jaw holder 108. Referring to FIG. 7, the jaw 110 has an opening 112 that is sized and shaped to snugly fit over the blade tip shroud 26 when the carriage 46 is moved to its lower position. The jaw 110 thus prevents the shroud 28 from rotating while the shank 16 is being rotated by the lower fixture assembly 44, thereby twisting the blade 12. Like the jaws of the lower fixture assembly 44, the jaw 110 is interchangeable such that jaws having different opening configurations can be mounted to the jaw holder 108 for engaging components other than the blade 12.

Figure 8:
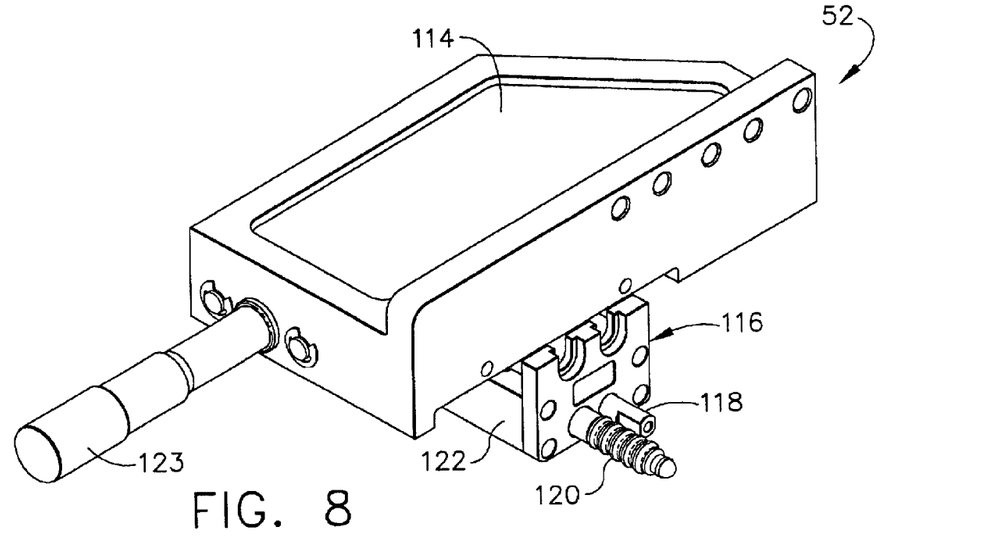
FIG. 8 is a perspective view of a gage for measuring component twist angle in the system of FIG. 1.

The carriage 46 also supports the gage 52 that measures the twist angle of the blade 12. Referring to FIG. 8, the gage 52 includes a holding plate 114 that is attached to the front side of the carriage 46. A probe sensing unit 116 is attached to the holding plate 114. The probe sensing unit 116 includes a fixed probe 118 and a sensing probe 120 spaced laterally with respect to one another. A slide cylinder 122 is provided for extension and retraction of the sensing probe 120, which can be any suitable probe, such as the Solarton ax-55 digital probe. Fine position adjustment is accomplished with a linear scale 123, such as a commercially available Starreh-263 linear scale. This allows the sensing probe 120 to be adjusted to accommodate different stages of low pressure turbine blades. During a twist angle measuring operation, the fixed probe 118 engages the convex side 22 of the blade airfoil 18 to provide a reference point. The sensing probe 120 is then moved into contact with the airfoil 18. The output of the sensing probe 189 is fed to the controller 56. The difference in longitudinal extension between the sensing probe 120 and the fixed probe 118 is then used to determine the twist angle.

In operation, the system 10 is activated by triggering the main power switch 54. Before switching on the system 10, the operator should ensure that the system 10 has a sufficient air supply for the pneumatic cylinder unit 70. A pressure sensor (not shown) is provided for detecting the air supply. Typically, an operating pressure between 5 to 7 bars is recommended.

Figure 9:
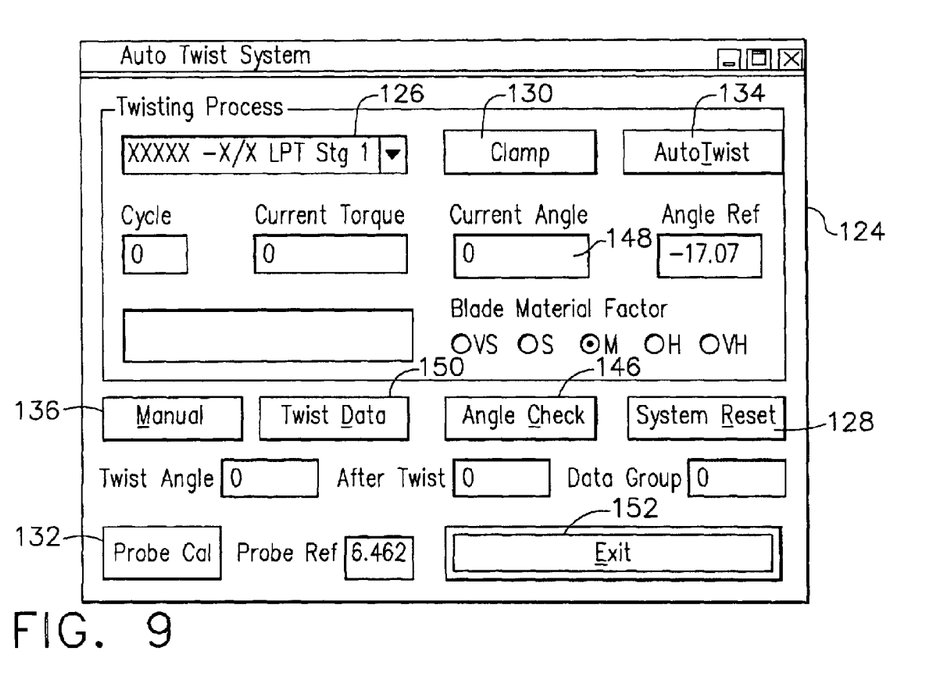
FIG. 9 graphically illustrates a control screen used in the present invention.

Next, the controller 56 is switched on and allowed to boot up. The operator then launches the Auto Twist software, causing a control screen 124 (shown in FIG. 9) to be displayed on the monitor of the controller 56. Before performing a twist correction operation, the system 10 is reset and calibrated. This is accomplished by selecting from the pull down menu 126 on the control screen 124 the type of component that will be undergoing the twist correction operation. By way of example only, FIG. 9 shows that a first stage, low pressure turbine blade has been selected as the component to be twist corrected. (As noted previously, the system 10 is not limited to low pressure turbine blades and can be used with many other components.) At this point, the operator should check that the jaws corresponding to the selected component are installed in the lower and upper fixture assemblies 44, 50. If the appropriate jaws are not installed, then they should be put in before proceeding.

The operator then selects the "System Reset" button 128 on the control screen 124, which causes the system 10 to perform a home search. (In one embodiment, the control screen 124 is configured as a touch-screen such that an operator "selects" a button by pressing on it with his or her finger. Alternatively, the control screen 124 could be configured such that "selecting" a button comprises clicking on the button with a pointing device such as a mouse.) Specifically, the carriage 46 is moved upward and the lower fixture assembly 44 is rotated. Once these elements come to a halt, the controller 56 recognizes their positions as the "home" positions.

The operator then selects the "Clamp" button 130 to move apart or open the first and second jaws 72, 74 of the lower fixture assembly 44. The "Clamp" button 130 functions like a toggle switch so that the pneumatic cylinder unit 70 is actuated to open or close the first and second jaws 72, 74 each time the "Clamp" button 130 is selected. With the first and second jaws 72, 74 open, a calibration blade is loaded with its dovetail positioned between the first and second jaws 72, 74. The calibration blade is oriented so that its convex side faces outwards. The operator selects the "Clamp" button 130 to close the jaws 72, 74 and clamp the blade into the lower fixture assembly 44 and checks that the calibration blade is properly seated. The "Probe Cal" button 132 is then selected to initiate the system calibration. The carriage 46 will first move up and then down such that the upper fixture assembly 50 engages the calibration blade. The lower fixture assembly 44 then rotates a predetermined amount from its home position. The sensing probe 120 then extends to contact the calibration blade to sense and calibrate this position. Once the calibration operation finishes, the carriage 46 automatically retracts. The operator selects the "Clamp" button 130 to open the first and second jaws 72, 74 and removes the calibration blade. The system 10 is now ready to perform twist correction operations on components of the selected type. A full system reset and calibration is performed each time the system 10 is powered up. Furthermore, this process is repeated when the system 10 is going to be used for twist correction of a different type of component.

To perform a twist correction operation, a blade to be repaired is loaded into the system 10 much like the calibration blade was loaded. With the first and second jaws 72, 74 open, the operator slides the blade shank 16 into position between the jaws 72, 74. The blade 12 is oriented so that the convex side 22 faces outwards. The operator then selects the "Clamp" button 130. The pneumatic cylinder unit 70 causes the jaws 72, 74 to close and clamp the blade 12 into the lower fixture assembly 44. The operator should check at this point to ensure that the blade 12 is properly seated and secured.

With the blade 12 loaded, the twist correction operation can be commenced. The system 10 is capable of operating in a continuous, automatic mode or in a manual mode. For continuous operation, the operator selects the "Auto Twist" button 134 on the control screen 124. In response, the controller 56 causes the motor 102 to rotate the screw 98 so that the carriage 46 moves the upper fixture assembly 50 into engagement with the blade shroud 26. Specifically, the upper jaw 110 engages the blade shroud 26 and the fixed probe 118 of the probe sensing unit 116 contacts the airfoil convex side 22. The sensing probe 120 is then moved into contact with the convex side 22 so that the current twist angle of the blade 12 can be measured. The controller 56 computes from this measurement how much the blade 12 needs to be twisted to achieve the desired twist angle. The rotary motor 88 is activated to rotate the lower fixture assembly 44 and twist the blade 12 accordingly. The last two steps are repeated until the desired twist angle is obtained. Once this cycle is completed, the carriage 46 is retracted to its home position. The operator selects the "Clamp" button 130 to open the lower jaws 72, 74 and removes the now-repaired blade 12. The system 10 is ready to receive the next blade to be twist corrected.

Figure 10:
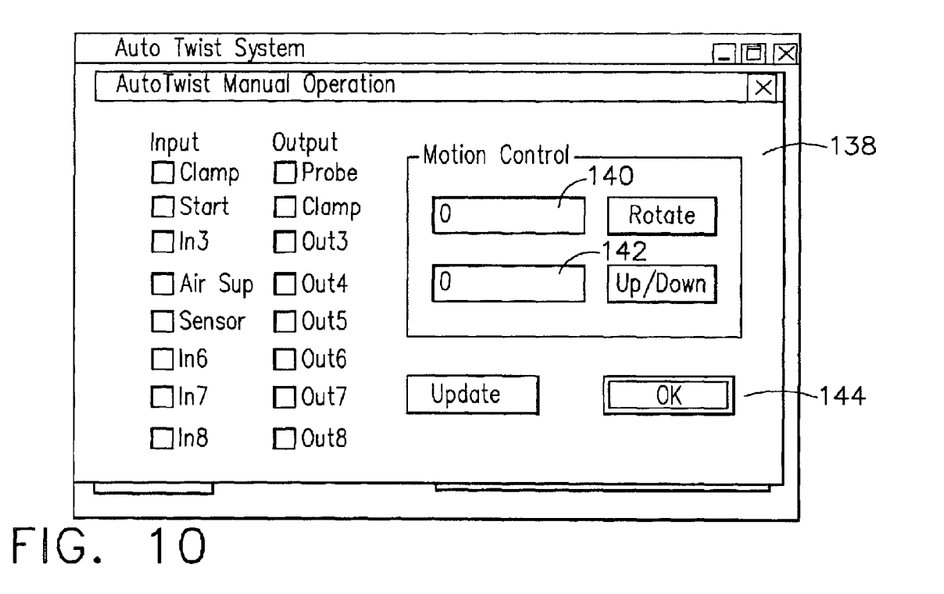
FIG. 10 graphically illustrates a manual control box used in the present invention.

The system 10 is also able to operate in a manual mode as an alternative to the automatic mode. In this case, the operator selects the "Manual" button 136 located on the control screen 124. This causes a manual operation box 138 (shown in FIG. 10) to be displayed on the monitor of the controller 56. Operations performed under manual mode, such as probing, clamping and unclamping, are initiated by selecting the appropriate boxes from the two columns of such boxes on the left side of the manual operation box 138. For rotary motion control of the lower fixture assembly 44 and linear motion control of the carriage 46, the operator enters the desired angle and vertical distance values into the first and second motion control windows 140, 142, respectively, on the right side of the manual operation box 138. The operator then selects the "OK" button 144 to effect the desired motion.

Apart from performing twist correction operations, the system 10 can be used to simply perform an angle check of the blade 12. Referring again to FIG. 9, this is accomplished by selecting the "Angle Check" button 146 appearing on the control screen 124. In response, the carriage 46 moves the upper fixture assembly 50 into engagement with the blade shroud 26. The sensing probe 120 is then moved into contact with the blade 12 to measure the blade's current twist angle. The measured angle is displayed in the "Current Angle" window 148 of the control screen 124.

The control screen 124 includes a "Twist Data" button 150. Selecting the "Twist Data" button 150 causes an input screen (not shown) to be displayed by the controller 56. The input screen allows the operator to edit and/or update blade twist data. Data such as the twist reference angle, angle tolerance, twist angle range (e.g., the operating range for the system 10), and the probe's vertical and twisting positions can be entered.

Once all twist correction operations have been completed, the operator selects the "Exit" button 152 on the control screen 124 to close the Auto Twist software application. The controller 56 can then be shut down. Finally, the operator turns off the system 10 via the main power switch 54.

The foregoing has described a system and method for easily and accurately correcting twist angle in airfoil components. While specific embodiments of the present invention have been described, it will be apparent to those skilled in the art that various modifications thereto can be made without departing from the spirit and scope of the invention as defined in the appended claims.

What is claimed is:

1. A system for correcting twist in airfoil components having a twist angle, said system comprising:
   a first fixture assembly for holding a first end of said airfoil component;
   a rotary drive unit for rotating said first fixture assembly about an axis;
   a second fixture assembly for holding a second end of said airfoil component, said second fixture assembly being aligned with said axis;
   means for measuring the twist angle of said airfoil component; and
   means for controlling said rotary drive unit in response to said means for measuring to obtain a desired twist angle.

2. The system of claim 1 wherein said rotary drive unit includes an adapter that engages said first fixture assembly and a motor drivingly coupled to said adapter.

3. The system of claim 2 further comprising a gear reducer unit coupled between said adapter and said motor.

4. The system of claim 2 further comprising a torque sensing assembly coupled between said adapter and said motor.

5. The system of claim 1 further comprising a carriage capable of moving linearly with respect to said first fixture assembly, said second fixture assembly being mounted on said carriage.

6. The system of claim 5 wherein said means for measuring includes a gage mounted on said carriage.

7. The system of claim 5 further comprising a screw rotatively mounted adjacent to said carriage, a motor drivingly coupled to said screw, and a nut threadingly mounted on said screw, said nut being attached to said carriage.

8. The system of claim 1 wherein said first fixture assembly includes:
   a base plate;
   first and second support blocks mounted to said base plate;
   a slide block slidingly mounted to said first support block;
   a pneumatic cylinder unit mounted on said first support block, said pneumatic cylinder unit engaging said slide block for moving said slide block relative to said second support block;
   a first jaw supported by said slide block; and
   a second jaw supported by said second support block in juxtaposition with said first jaw.

9. The system of claim 8 wherein said first and second jaws are interchangeable.

10. The system of claim 1 wherein said second fixture assembly includes a jaw holder and a jaw attached to said jaw holder.

11. The system of claim 10 wherein said jaw is interchangeable.

12. A system for correcting twist in airfoil components having a twist angle, said system comprising:
- a base having a lower portion and an upper portion extending vertically upward from said lower portion;
- a horizontal plate supported by said lower portion;
- a vertical plate supported by said upper portion;
- a lower fixture assembly for holding a first end of an airfoil component mounted on said horizontal plate;
- a rotary drive unit for rotating said lower fixture assembly mounted to said horizontal plate;
- a carriage slidingly mounted on said vertical plate;
- an upper fixture assembly for holding a second end of said airfoil component mounted on said carriage directly above said lower fixture assembly;
- a gage for measuring twist angle in said airfoil component mounted on said carriage; and
- a controller for controlling said rotary drive unit in response to input from said gage to obtain a desired twist angle, wherein said lower fixture assembly includes:
  - a base plate engaged by said rotary drive unit;
  - first and second support blocks mounted to said base plate;
  - a slide block slidingly mounted to said first support block;
  - a pneumatic cylinder unit mounted on said first support block, said pneumatic cylinder unit engaging said slide block for moving said slide block relative to said second support block;
  - a first law supported by said slide block; and
  - a second law supported by said second support block in juxtaposition with said first law.

13. The system of claim 12 wherein said rotary drive unit includes an adapter that engages said lower fixture assembly and a motor drivingly coupled to said adapter.

14. The system of claim 13 further comprising a gear reducer unit coupled between said adapter and said motor.

15. The system of claim 13 further comprising a torque sensing assembly coupled between said adapter and said motor.

16. The system of claim 12 further comprising a screw rotatively mounted to said vertical plate, a motor drivingly coupled to said screw, and a nut threadingly mounted on said screw, said nut being attached to said carriage.

17. The system of claim 16 wherein said motor is controlled by said controller.

18. The system of claim 12 wherein said first and second laws are interchangeable.

19. The system of claim 12 wherein said upper fixture assembly includes a jaw holder attached to said carriage and a jaw attached to said jaw holder.

20. The system of claim 19 wherein said jaw is interchangeable.

* * * * *

UNITED STATES PATENT AND TRADEMARK OFFICE
CERTIFICATE OF CORRECTION

PATENT NO.    : 6,792,655 B2
DATED         : September 21, 2004
INVENTOR(S)   : Wah It is certified that error appears in the above-identified patent and that said Letters Patent is hereby corrected as shown below:

<u>Column 10,</u>
Line 5, after "a first" delete "law" and insert therefor -- jaw --.
Line 6, after "a second" delete "law" and insert therefor -- jaw --.
Line 7, after "said first" delete "law" and insert therefor -- jaw --.
Line 24, after "first and second" delete "laws" and insert therefor -- jaws --.

Signed and Sealed this

Twenty-ninth Day of November, 2005

JON W. DUDAS
*Director of the United States Patent and Trademark Office*